(12) United States Patent
Chang et al.

(10) Patent No.: US 9,819,291 B2
(45) Date of Patent: Nov. 14, 2017

(54) DIRECT-CURRENT MOTOR CONTROL DEVICE

(71) Applicant: QUAN MEI TECHNOLOGY CO., LTD., Kaohsiung (TW)

(72) Inventors: Shiu-Ming Chang, Kaohsiung (TW); Kuo-Hsien Huang, Tainan (TW)

(73) Assignee: Quan Mei Technology Co., Ltd., Kaohsiung (TW)

( * ) Notice: Subject to any disclaimer, the term of this patent is extended or adjusted under 35 U.S.C. 154(b) by 0 days.

(21) Appl. No.: 15/217,001

(22) Filed: Jul. 22, 2016

(65) Prior Publication Data

US 2017/0040917 A1 Feb. 9, 2017

(30) Foreign Application Priority Data

Aug. 7, 2015 (TW) .............................. 104125786 A

(51) Int. Cl.
| | |
|---|---|
| H02P 1/00 | (2006.01) |
| H02P 7/29 | (2016.01) |
| H02P 29/02 | (2016.01) |
| H02H 7/08 | (2006.01) |

(52) U.S. Cl.
CPC ............. *H02P 7/29* (2013.01); *H02H 7/0811* (2013.01); *H02P 29/02* (2013.01)

(58) Field of Classification Search
USPC .................................. 318/139, 125, 599, 503
See application file for complete search history.

(56) References Cited

U.S. PATENT DOCUMENTS

| | | | | | |
|---|---|---|---|---|---|
| 5,260,607 | A | * | 11/1993 | Kinbara ................... | H02M 1/34 327/427 |
| 5,436,540 | A | * | 7/1995 | Kumar ...................... | B60L 7/22 318/139 |
| 5,627,741 | A | * | 5/1997 | Naruo .................. | H02M 1/4208 363/89 |
| 5,982,649 | A | * | 11/1999 | Turner ................... | H02M 3/155 363/126 |
| 8,934,275 | B2 | * | 1/2015 | Temesi ............. | H03K 17/08128 363/131 |
| 9,639,106 | B2 | * | 5/2017 | Gazit ........................ | G05F 3/08 |

* cited by examiner

*Primary Examiner* — Jorge L Carrasquillo
(74) *Attorney, Agent, or Firm* — Muncy, Geissler, Olds & Lowe, P.C.

(57) ABSTRACT

A direct-current (DC) motor control device includes first and second switches, a conducting element and a power storage element. The power storage element, the conducting element and the second switch are connected to each other and form a loop, and the first switch is connected to a common node between the power storage element and the conducting element. When the DC electric power source is normally connected to the DC motor control device, the first switch is turned on, and the conducting element establishes a unidirectional conduction from a DC motor to the power storage element while the second switch is turned off.

6 Claims, 6 Drawing Sheets

DIRECT-CURRENT MOTOR CONTROL DEVICE

CROSS-REFERENCE TO RELATED APPLICATION

This application claims priority of Taiwanese Patent Application No. 104125786, filed on Aug. 7, 2015.

FIELD

The disclosure relates to a motor control device, and more particularly to a direct-current (DC) motor control device.

BACKGROUND

A conventional DC motor control device 100 is illustrated in FIG. 1 for controlling a DC motor 400, and includes a diode 101, a switch 102 and a capacitor 103. The conventional DC motor control device 100 lacks a reverse installation protection, and thus, the diode 101 and the switch 102 may be damaged by a large current flowing therethrough when a user mistakenly installs a DC power source 200 reversely on the conventional DC control device 100. In addition, relatively large variation in amplitude of a current provided by the conventional DC motor control device 100 to the DC motor 400 may cause high electromagnetic interference (EMI) and large current ripple as well, resulting in imprecise measurement of locked-rotor current (also called stall current), and thereby damaging the DC motor 400.

SUMMARY

Therefore, an object of the disclosure is to provide a DC motor control device that can alleviate at least one of the drawbacks of the prior art.

According to the disclosure, the direct-current (DC) motor control device is configured to be electrically connected between a DC electric power source having a positive electrode and a negative electrode, and a DC motor having a positive pole and a negative pole. The DC motor control device includes an input terminal unit, first and second switches, an inductor, a power storage element, and first and second conducting elements.

The input terminal unit includes a first input terminal and a second input terminal that are configured to be electrically connected to the DC electric power source.

The first switch includes a first switch terminal electrically connected to the first input terminal of the input terminal unit, and a second switch terminal. The first switch terminal is configured to be electrically connected to the positive pole of the DC motor.

The inductor includes a first inductor end electrically connected to the second switch terminal of the first switch, and a second inductor end.

The power storage element includes a first storage end electrically connected to the second inductor end of the inductor, and a second storage end electrically connected to the second input terminal.

The first conducting element includes a first conducting terminal configured to be electrically connected to the negative pole of the DC motor, and a second conducting terminal electrically connected to the first storage end.

The second conducting element includes a third conducting terminal electrically connected to the second input terminal, and a fourth conducting terminal electrically connected to the first conducting terminal of the first conducting element.

The second switch includes a third switch terminal electrically connected to the second input terminal, and a fourth switch terminal electrically connected to the first conducting terminal of the first conducting element. The second switch is configured to receive a pulse-width modulation (PWM) signal and to be turned on or off in response to the PWM signal.

The first switch is configured to be turned on when said first and second input terminals are connected respectively to the positive and negative electrodes of the DC electric power source, and to be turned off when the first and second input terminals are connected respectively to the negative and positive electrodes of the DC electric power source. The first conducting element is configured to establish a unidirectional conduction from the negative pole of the DC motor to the first storage end when the first input terminal is connected to the positive electrode of the DC electric power source and the second switch is turned off. The second conducting element is configured to establish a unidirectional conduction from the second input terminal to the negative pole of the DC motor when the second input terminal is connected to the positive electrode of the DC electric power source.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before providing description of this disclosure in detail, it should be noted herein that throughout this disclosure, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 1:
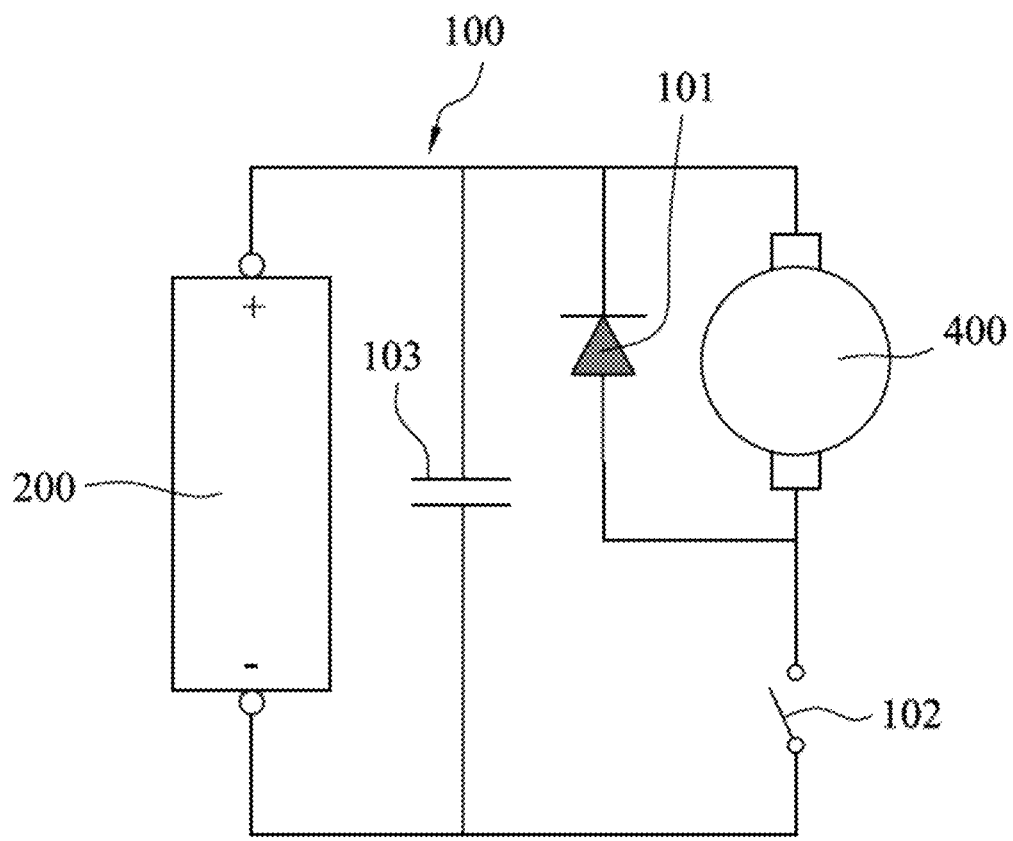
FIG. 1 is a schematic circuit diagram of a conventional DC motor control device.
Figure 2:
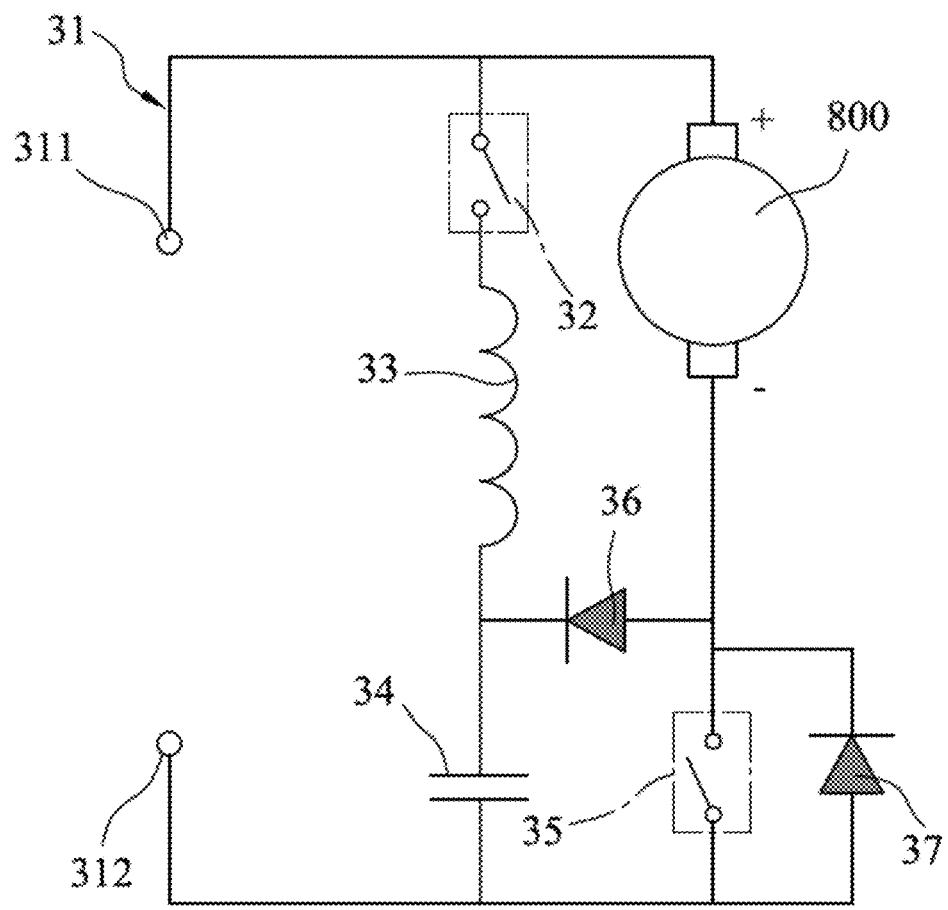
FIG. 2 is a schematic circuit diagram of an embodiment of a DC motor control device according to the disclosure.
Figure 3:
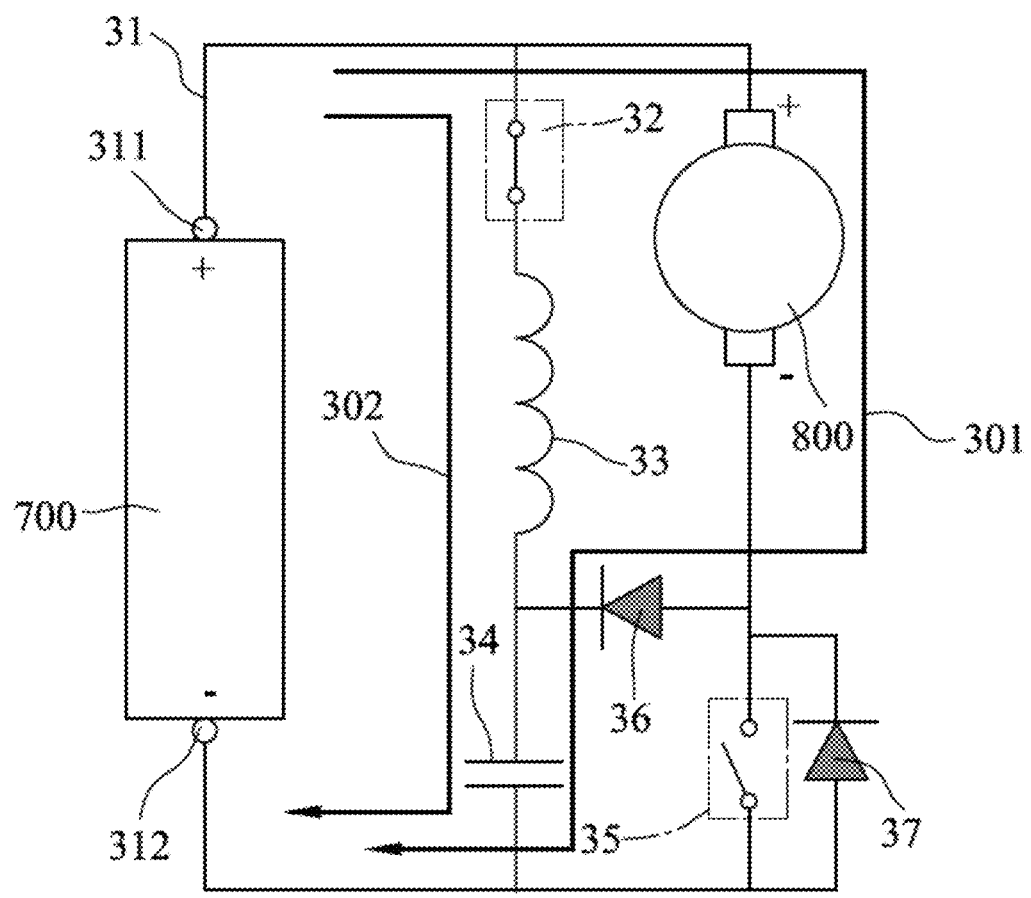
FIG. 3 is a schematic circuit diagram illustrating current paths when a first switch is closed and a second switch is opened.

Referring to FIGS. 2 and 3, an embodiment of a direct-current (DC) motor control device is illustrated. The DC motor control device is configured to be electrically connected between a DC electric power source 700 and a DC motor 800, as depicted in FIG. 3. The DC electric power source 700 has a positive electrode and a negative electrode, and the DC motor 800 has a positive pole and a negative pole. The DC motor control device is further configured to be electrically connected to a speed control device (not shown) for controlling rotational speed of the DC motor 800.

The DC motor control device includes an input terminal unit 31, a first switch 32, an inductor 33, a power storage element 34, a second switch 35, a first conducting element 36 and a second conducting element 37.

The input terminal unit 31 includes a first input terminal 311 and a second input terminal 312 that are configured to be electrically connected to the DC electric power source 700 as depicted in FIG. 3.

The first switch 32, the inductor 33 and the power storage element 34 are electrically connected in series between the first and second input terminals 311 and 312. In particular, the first switch 32 includes a first switch terminal electrically connected to the first input terminal 311 of the input terminal unit 31, and a second switch terminal. The first switch terminal is configured to be electrically connected to the positive pole of the DC motor 800. The first switch 32 is configured to be turned on when the first input terminal 311 and the second input terminal 312 are connected respectively to the positive and negative electrodes of the DC electric power source 700 (i.e., under a normal installation of the DC electric power source 700), and to be turned off when the first input terminal 311 and the second input terminal 312 are connected respectively to the negative and positive electrodes of the DC electric power source 700 (i.e., under a reverse installation of the DC electric power source 700).

The inductor 33 includes a first inductor end electrically connected to the second switch terminal of the first switch 32, and a second inductor end. The power storage element 34 includes a first storage end electrically connected to the second inductor end of the inductor 33, and a second storage end electrically connected to the second input terminal 312.

The first conducting element 36 includes a first conducting terminal configured to be electrically connected to the negative pole of the DC motor 800, and a second conducting terminal electrically connected to the first storage end (i.e., to a common node between the inductor 33 and the power storage element 34). In this embodiment, the first conducting element 36 is a diode having an anode and a cathode that serve as the first conducting terminal and the second conducting terminal, respectively. However, the first conducting element 36 is not limited to a diode in other embodiments.

The second conducting element 37 includes a third conducting terminal electrically connected to the second input terminal 312, and a fourth conducting terminal electrically connected to the first conducting terminal of the first conducting element 36. In this embodiment, the second conducting element 37 is a diode having an anode and a cathode that serve as the third conducting terminal and the fourth conducting terminal, respectively. However, the second conducting element 37 is not limited to a diode in other embodiments.

The second switch 35 is a switch configured to receive a high-frequency PWM signal, and includes a third switch terminal electrically connected to the second input terminal 312, and a fourth switch terminal electrically connected to the first conducting terminal of the first conducting element 36. Namely, the second switch 35 and the second conducting element 37 are electrically connected in parallel.

Figure 4:
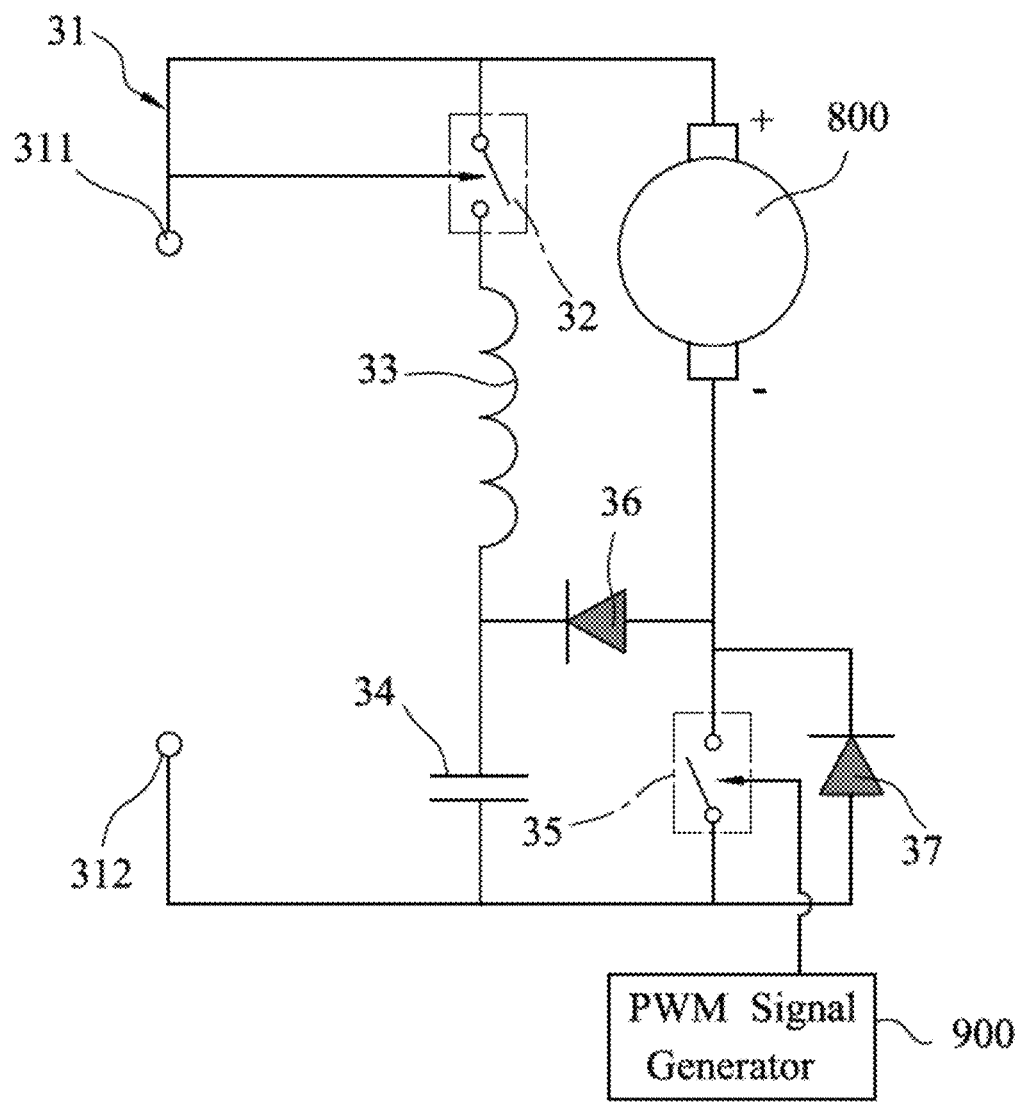
FIG. 4 is a schematic circuit diagram illustrating an exemplary embodiment of the first and second switches.

FIG. 4 shows an exemplary embodiment of the first and second switches 32, 35. In this embodiment, the first switch 32 and the second switch 35 are transistors, such as Metal-Oxide-Semiconductor Field-Effect Transistors (MOSFETs), Insulated Gate Bipolar Transistors (IGBTs), Gate Turn-Off thyristors (GTO thyristors), Bipolar Junction Transistors (BJTs), etc. The first switch 32 further includes a control terminal electrically connected to the first input terminal 311. The second switch 35 further includes a control terminal electrically connected to a pulse-width modulation (PWM) signal generator 900 that serves as the speed control device. The second switch 35 is configured to receive a PWM signal from the PWM signal generator 900 at the control terminal, and is controlled by the PWM signal. In particular, the second switch 35 is turned on when the PWM signal is logic 1 (i.e., high level), and is turned off when the PWM signal is logic 0 (i.e., low level). Accordingly, the second switch 35 is turned on and off alternately in response to the PWM signal, so that operating voltage of the DC motor 800 is modulated and the rotational speed of the DC motor 800 is modulated resultantly. However, the first and second switches 32 and 35 are not limited to the above devices in other embodiments.

The first conducting element 36 is configured to establish a unidirectional conduction from the negative pole of the DC motor 800 to the first storage end of the power storage element 34 when the DC electric power source 700 is normally installed on the DC motor control device and the second switch 35 is turned off, as depicted in FIG. 3.

Figure 6:
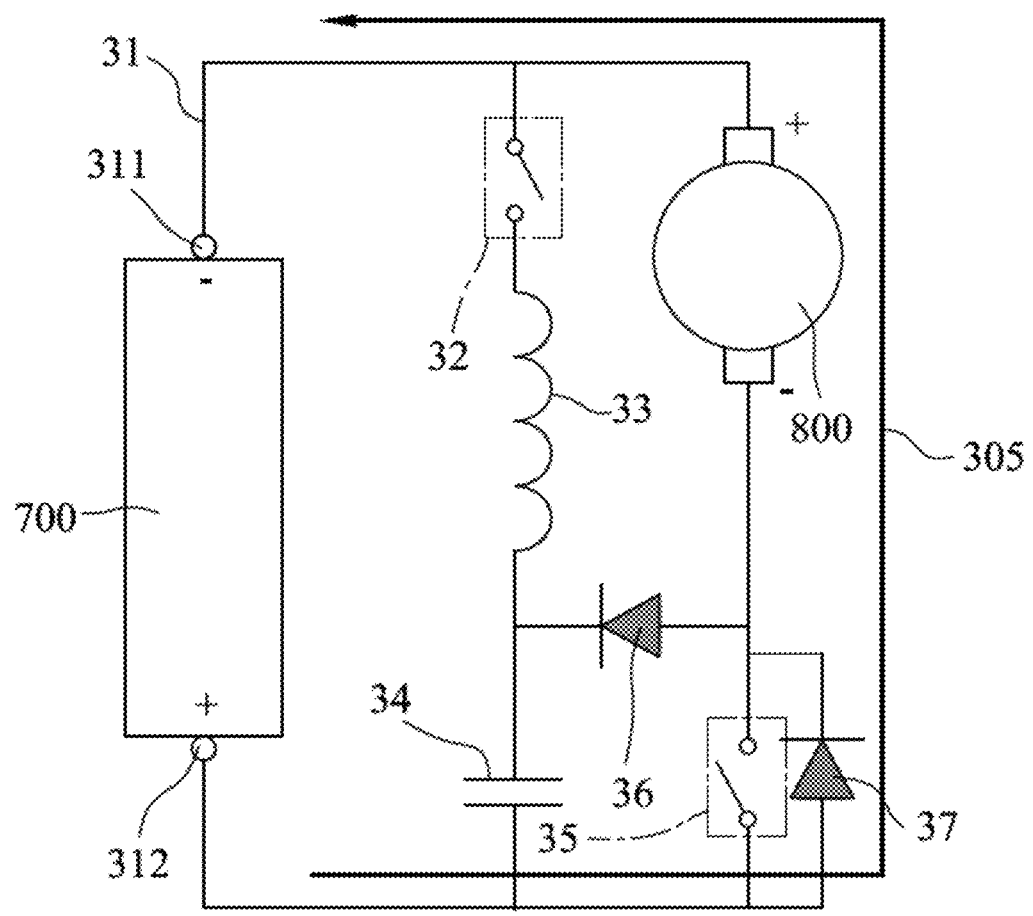
FIG. 6 is a schematic circuit diagram illustrating current paths in a case of a reverse installation of a DC electric power source on the DC motor control device.

The second conducting element 37 is configured to establish a unidirectional conduction from the second input terminal 312 to the negative pole of the DC motor 800 when the DC electric power source 700 is reversely installed on the DC motor control device, as depicted in FIG. 6.

Figure 5:
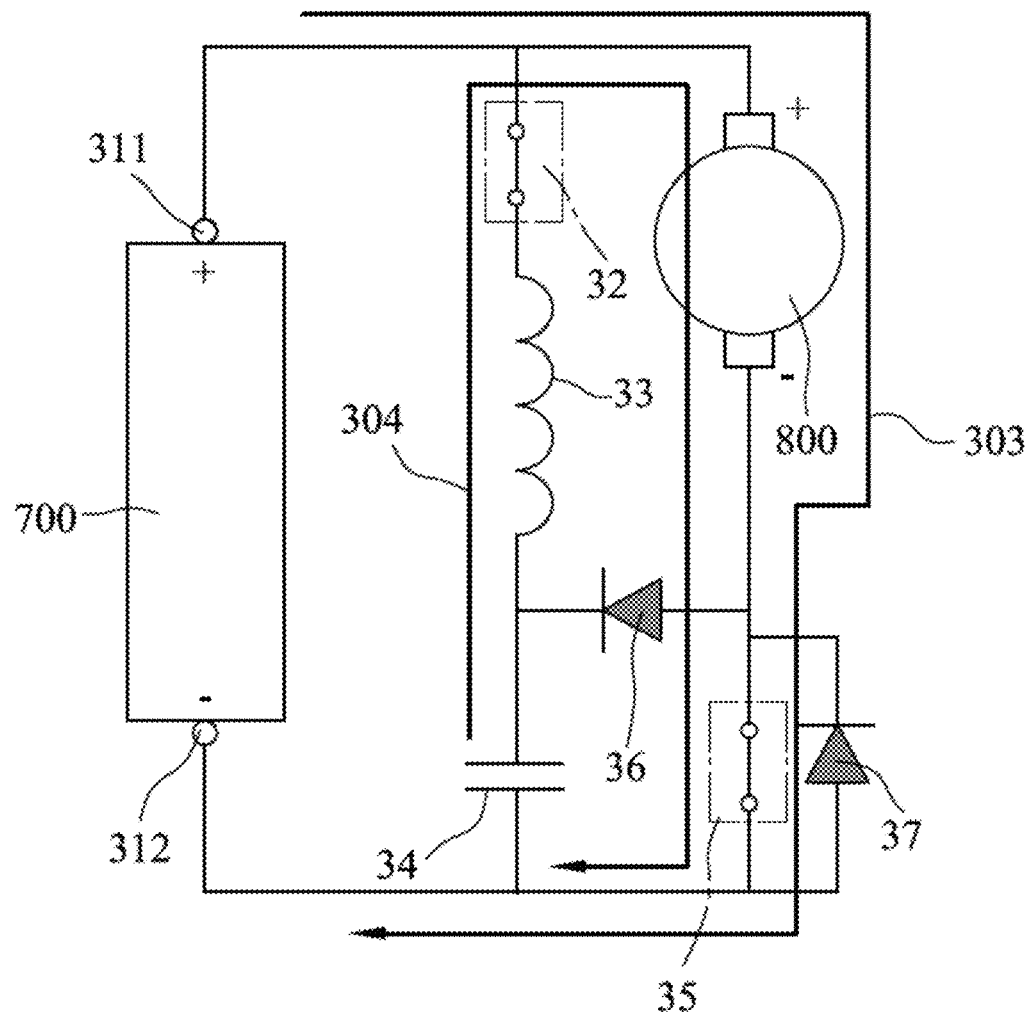
FIG. 5 is a schematic circuit diagram illustrating current paths when both the first and the second switches are closed.

As illustrated in FIGS. 3 and 5, the DC electric power source 700 is normally installed on the DC motor control device, which turns on the first switch 32. In addition, the second switch 35 receives the PWM signal from the PWM signal generator 900, and is turned on and off alternately in response to the PWM signal. As a result, a duration in which the second switch 35 is turned on is changed according to a duty cycle of the PWM signal. Consequently, the operating voltage of the DC motor 800 can be controlled, and so can the rotational speed of the DC motor 800. The operating voltage is equal to a product of a voltage provided by the DC electric power source 700 and the duty cycle of the PWM signal. Since controlling the rotational speed of the DC motor 800 by the PWM signal is well known in the art, details thereof will be omitted herein for the sake of brevity.

When the second switch 35 is turned on as depicted in FIG. 5, i.e., when the PWM signal is logic 1, the DC motor 800 is driven to operate and the rotational speed thereof is changed according to the duty cycle of the PWM signal.

When the second switch 35 is turned off as depicted in FIG. 3, i.e., when the PWM signal is logic 0, the first conducting element 36 establishes the unidirectional conduction from the DC motor 800 to the power storage element 34. In this situation, the DC motor 800 operates as a generator, and charges the power storage element 34 with counter electromotive force generated thereby via a first charging current 301 as indicated in FIG. 3. When the counter electromotive force cannot be used to charge the power storage element 34, and when the voltage of the DC electric power source 700 is greater than that of the power storage element 34, the power storage element 34 can be charged by the DC electric power source 700 via a second charging current 302 flowing through the first switch 32 and the inductor 33 as indicated in FIG. 3.

Furthermore, when the second switch 35 is turned off, the DC electric power source 700 charges the power storage element 34, so the first charging current 301 flowing through the DC motor 800 would decrease gradually rather than abruptly, which effectively alleviates current ripple flowing through the DC motor 800 and electromagnetic interference (EMI) as well. As a result, measurement of a locked-rotor current of the DC motor 800 may be relatively precise.

Referring to FIG. 5, when the second switch 35 is turned on again as the PWM signal changes to logic 1, the DC electric power source 700 supplies energy to the DC motor 800 for operation via a primary supplying current 303. Besides, the power storage element 34 also discharges to supply energy to the DC motor 800 via a secondary supplying current 304 flowing through the inductor 33 and the first switch 32. Therefore, the DC electric power source 700 does not have to provide by itself to the DC motor 800 all necessary energy for operation, and energy of the counter electromotive force generated by the DC motor 800 can be used effectively. As a result, efficiency of energy utilization of the DC motor control device is relatively greater.

As illustrated in FIG. 6, when the DC electric power source 700 is reversely installed on the DC motor control device, the first switch 32 and the second switch 35 are instantly turned off, and the second conducting element 37 establishes the unidirectional conduction from the second input terminal 312 to the DC motor 800, so as to direct a current 305 to flow to the DC motor 800 for driving the DC motor 800 to rotate reversely. Accordingly, there is no large current flowing through the second switch 35 and the first switch 32, preventing damage to the first and second switches 32, 35.

To sum up, by virtue of the power storage element 34, the current ripple flowing through the DC motor 800 and electromagnetic interference (EMI) are effectively alleviated, and hence the locked-rotor current may be measured more precisely and easily, thereby alleviating influence on the DC motor 800 attributed to the locked-rotor current. Also, the power storage element 34 supplies additional energy to the DC motor 800 when the second switch 35 is turned on, so the efficiency of energy utilization of the DC motor control device is increased.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A direct-current (DC) motor control device configured to be electrically connected between a DC electric power source having a positive electrode and a negative electrode, and a DC motor having a positive pole and a negative pole, said DC motor control device comprising:
    an input terminal unit including a first input terminal and a second input terminal that are configured to be electrically connected to the DC electric power source;
    a first switch including a first switch terminal electrically connected to said first input terminal of said input terminal unit, and a second switch terminal, said first switch terminal being configured to be electrically connected to the positive pole of the DC motor;
    an inductor including a first inductor end electrically connected to said second switch terminal of said first switch, and a second inductor end;
    a power storage element including a first storage end electrically connected to said second inductor end of said inductor, and a second storage end electrically connected to said second input terminal;
    a first conducting element including a first conducting terminal configured to be electrically connected to the negative pole of the DC motor, and a second conducting terminal electrically connected to said first storage end;
    a second conducting element including a third conducting terminal electrically connected to said second input terminal, and a fourth conducting terminal electrically connected to said first conducting terminal of said first conducting element; and
    a second switch including a third switch terminal electrically connected to said second input terminal, and a fourth switch terminal electrically connected to said first conducting terminal of said first conducting element, said second switch being configured to receive a pulse-width modulation (PWM) signal and to be turned on or off in response to the PWM signal;
    wherein said first switch is configured to be turned on when said first and second input terminals are connected respectively to the positive and negative electrodes of the DC electric power source, and to be turned off when said first and second input terminals are connected respectively to the negative and positive electrodes of the DC electric power source,
    wherein said first conducting element is configured to establish a unidirectional conduction from the negative pole of the DC motor to said first storage end when said first input terminal is connected to the positive electrode of the DC electric power source and said second switch is turned off,
    wherein said second conducting element is configured to establish a unidirectional conduction from said second input terminal to the negative pole of the DC motor when said second input terminal is connected to the positive electrode of the DC electric power source.

2. The DC motor control device as claimed in claim 1, wherein said first conducting element is a diode having an anode and a cathode that serve as said first conducting terminal and said second conducting terminal, respectively.

3. The DC motor control device as claimed in claim 1, wherein said second conducting element is a diode having an anode and a cathode that serve as said third conducting terminal and said fourth conducting terminal, respectively.

4. The DC motor control device as claimed in claim 1, wherein said first switch and said second switch are transistors.

5. The DC motor control device as claimed in claim 4, wherein said first switch further includes a control terminal electrically connected to said first input terminal.

6. The DC motor control device as claimed in claim 4, wherein said second switch further includes a control terminal configured to receive the PWM signal.

* * * * *